United States Patent Office 2,889,290
Patented June 2, 1959

2,889,290

LINEAR POLYCYCLOSPIROACETALS AND METHOD FOR PREPARING THEM

David B. Capps, Decatur, Ala., assignor to The Chemstrand Corporation, Decatur, Ala., a corporation of Delaware No Drawing. Application October 1, 1956
Serial No. 612,916

19 Claims. (Cl. 260—2)

This application relates to new synthetic linear polymers and a method for preparing them. More particularly it relates to linear polycyclospiroacetals.

Polymers or spirans containing recurring spiro linkages are known in the art. In general, spiro compounds are cyclic compounds which have a carbon atom common to an adjacent cyclic structure such as

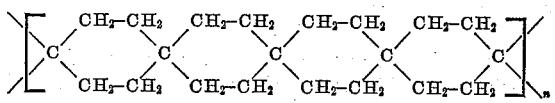

Another characteristic type illustrative of the spirans are structures having a plurality of rings which are paired through spiro linkages and each pair of rings separated from adjacent pairs of rings by a carbon bond such as

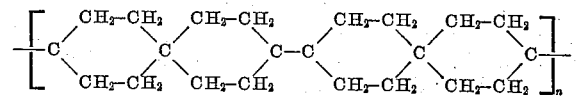

Still another type of spirans are those having a plurality of rings, all of which are connected by spiro linkages, such as

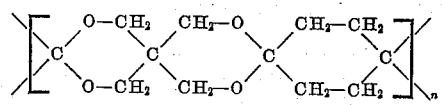

It is an object of the invention to provide a new type of synthetic linear polymer. A further object is the preparation of new linear polycyclospiroacetals, employing as one of the initial reactants a dialdehyde tetraalkylacetal. Other objects and advantages of the invention will be apparent from the description thereof hereinafter.

In general, the objects of the instant invention are accomplished by preparing the new synthetic linear polycyclospiroacetals from pentaerythritol and a dialdehyde tetraalkylacetal.

The new synthetic linear polycyclospiroacetals of the present invention have as the recurring structural unit

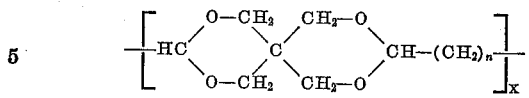

wherein $n$ is an integer from 1 to 6 and X is at least 20 or greater. The polycyclospiroacetals of the present invention have high melting points depending upon the number of —$CH_2$— groups interpersed between the spiro residues. For example, with the minimum number of —$CH_2$— groups, the melting point is as high as 250° C. At the upper limit of —$CH_2$— groups the melting point is as low at 200° C. This property of the instant polymers, of course, makes it highly desirable for use in the textile field. The instant polymers also show a lateral order in a range of about 65 to 85 percent. Lateral order may be defined as the measure of the amount of order of the chain molecules in the polymer which is obtained by measuring the intensity of the scattered X-radiations as a function of the Bragg Angle of diffraction. Such lateral order readings as those obtained by the polymers of this invention indicate a high degree of crystallinity, which is normally a desirable property for the purpose of filament and fiber formation.

It is believed that the synthetic linear polymeric polycyclospiroacetals of the instant invention are formed in accordance with the following mechanism:

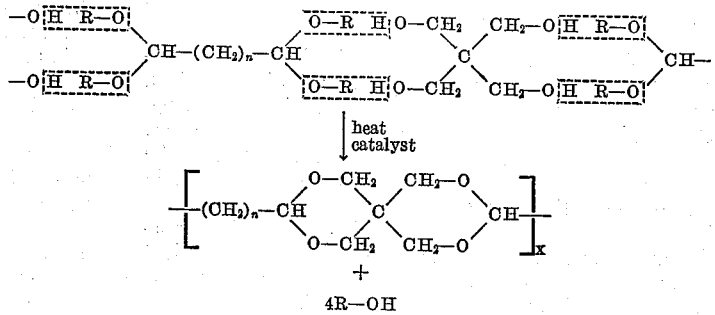

It will be noted that tetrafunctional compounds are employed in the reaction. However, with respect to the formation of spirans, these tetrafunctional compounds act as bifunctional compounds thus the spiro ring is formed; i.e. bifunctional spiran-forming compounds are those which exhibit two sets of reactive groups which react in pairs in the formation of spiro rings.

In preparing the polycyclospiroacetals of the present invention, there is employed as initial reactants pentaerythritol and a dialdehyde tetraalkylacetal dissolved at least partially in a common solvent therefor. Subsequently, the polymerization is carried out under normal conditions employed in solution polymerization under an inert atmosphere and in the presence of a catalyst.

The dialdehyde tetraalkylacetals which may be employed in practising the instant invention are bifunctional spiran-forming compounds having the general formula

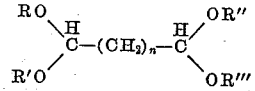

wherein R, R', R" and R''' are alkyl groups containing 1 to 4 carbon carbon atoms and $n$ is an integer from 1 to 6. Among such compounds are malonaldehyde tetraethylacetal, succinaldehyde tetraethylacetal, glutaraldehyde tetraethylacetal, adipaldehyde tetraethylacetal, pimelaldehyde tetraethylacetal, suberaldehyde teraethylacetal, malonaldehyde tetramethylacetal, succinaldehyde tetramethylacetal, glutaraldehyde tetramethylacetal, adipaldehyde tetramethylacetal, pimelaldehyde tetramethylacetal, suberaldehyde tetramethylacetal, malonaldehyde tetrapropylacetal, succinaldehyde tetrapropylacetal, glutaraldehyde tetrapropylacetal, adipaldehyde tetrapropylacetal, pimelaldehyde tetrapropylacetal, suberaldehyde tetrapropylacetal, malonaldehyde tetrabutylacetal, succinaldehyde tetrabutylacetal, glutaraldehyde tetrabutylacetal, adipaldehyde tetrabutylacetal, pimelaldehyde tetrabutylacetal and suberaldehyde tetrabutylacetal; malonaldehyde triethylmethylacetal, malonaldehyde trimethylmonoethylacetal, malonaldehyde tri-n-butylmonomethylacetal, malonaldehyde diethyldimethylacetal, succinaldehyde diethyldimethylacetal, succinaldehyde trimethylmonopropylacetal, glutaraldehyde trimethylmonopropylacetal, glutaraldehyde diethyldibutylacetal, glutaraldehyde tributylmonoethylacetal, glutaraldehyde monobutyltrimethylacetal, adipaldehyde triethylmonomethylacetal, adipaldehyde mono-n-butyltriethylacetal, adipaldehyde diethyldimethylacetal, pimelaldehyde trimethylmonoethylacetal, pimelaldehyde diethyldimethylacetal. Compounds having the above formula must be those which, when entering into the reaction with pentaerythritol, produce an alcohol which is volatile and readily removable from the reaction mixture. For example, when malonaldehyde tetramethylacetal is employed, volatile methyl alcohol is formed which is easily removed from the reaction mixture. On the other hand, dialdehyde tetrabenzylacetals will not perform satisfactorily in the instant invention since the benzyl alcohol formed during the reaction is not sufficiently volatile at the polymerization temperatures employed to allow the free escape thereof from the reaction mixture. The instant reaction is a reversible one and removal of the by-product alcohol is necessary in order to enable the polymerization to proceed.

In order to facilitate the polymerization of the polycyclospiroacetals, the initial reactants are dissolved in a common solvent, such as ortho-phenylanisole, diphenyl ether, nitrobenzene, sulfolane, para-dimethoxybenzene and para-phenylanisole. It is not necessary that the entire amount of pentaerythritol employed be soluble in the polymerization mixture, since when that portion which is dissolved reacts, more of the initially undissolved portion goes into solution. It has been found that a sufficient amount of solvent should be employed so that the resulting reaction mixture may be stirred or agitated adequately at all stages of the polymerization.

In preparing the compositions of the instant invention, equimolecular portions of the initial reactants are employed. An excess of 3 mole percent of any one reactant results in polymers having reduced molecular weights and inferior physical fiber-forming properties. However, an allowance of up to 1 mole percent of an excess of the equimolecular amount may be employed with the resulting polymer exhibiting satisfactory physical properties.

It is desirable to use a catalyst to carry out the reaction within a reasonable length of time. The amount of catalyst employed may vary within a wide range. It has been found, however, that preferably the catalysts should be added to the reaction mixture in small incremental amounts of the order of 0.0001 to 0.0005 mole per mole of pentaerythritol in order to prevent a violent reaction or frothing of the reaction mixture. Strong mineral acids, Friedel-Crafts catalysts and certain organic sulfonic acids are suitable catalysts. Specifically, there may be named sulfuric acid, hydrochloric acid, aluminum chloride, boron fluoride and its complexes, boron fluoride etherates, para-toluene sulfonic acid and camphor sulfonic acid. However, hydrogen chloride has been found to be the most suitable catalyst for convenient handling in small quantities and because it causes little or no decomposition of the reactants.

The polymerization is carried out at temperatures between 60° C. and 280° C. for a period of up to 4 hours. However, temperatures between 120° C. and 260° C. are preferred. The reaction is begun at low temperatures, that is, about 120° C. and gradually raised to the upper limits after approximately 75 percent or more conversion of the reactants has taken place. After polymerization is complete the resulting mixture is cooled, triturated with acetone and filtered, and the polymer washed until it is free of the reaction solvent. The resulting polymer is a granular white powder insoluble in most of the common organic solvents. However, phenol, resorcinol, aqueous resorcinol, substituted phenols such as meta-cresol, 6-tertiary-butyl-meta-cresol, 1,1,1-trichloro-3-nitro-2-propanol, 2,2,2-trichloro-1-ethoxyethanol, monochloroacetic acid, dichloro acetic acid, trichloroethanol, trichloroacetic acid, chloral hydrate and saturated aqueous chloral hydrate are solvents for the polymers at room temperature or at the melting point of those solvents mentioned above which are solids at room temperature. The polycyclospiroacetals of the instant invention have a specific viscosity of 0.3 to 1.0 when a 0.25 gram sample is dissolved in 50 milliliters of a mixture containing 65 percent phenol and 35 percent meta-cresol at 25° C.

The following examples are intended to illustrate the new polymers of the invention more fully, but are not intended to limit the scope of the invention, for it is possible to effect many modifications therein. In the examples, all parts and percents are by weight unless otherwise indicated.

*Example I*

To an equimolecular mixture of 3.40 grams of pentaerythritol and 6.21 grams of glutaraldehyde tetraethylacetal was added 10 milliliters of purified ortho-phenylanisole. This mixture was agitated in an atmosphere of nitrogen at 125° C. for 140 minutes during which time 0.8 milliliter of gaseous hydrogen chloride was added in 5 increments. The temperature was then raised to and held at 197° C. for 40 minutes and 0.1 milliliter more of hydrogen chloride was added. The resulting mixture was cooled, triturated with acetone and filtered. The trituration and filtration with acetone was repeated three times more and subsequently once with water and finally once more with acetone. A 4.5 gram yield of white granular polycyclospiroacetal was obtained which becomes slightly plastic at 245° C. The polymer had a specific viscosity of 0.325 when 0.25 gram was dissolved in 50 milliliters of a mixture of 400 parts phenol, 200 parts trichlorophenol and 1 part water at 25° C. X-ray diffraction indicates 72 percent lateral order. The polymer readily formed filaments when spun from a "dope" containing 0.5 gram of the polymer in 2 milliliters of a solvent containing 400 parts phenol, 200 parts trichlorophenol and 1 part water. Filaments passed through an alcohol bath were readily cold drawable to many times their length.

*Example II*

A mixture of 46.441 grams (0.3411 mole) of pulverized pentaerythritol ("Hercules mono-PE"), 84.815 grams (.3415 mole, 0.12 mole percent excess over pentaerythritol), of glutaraldehyde tetraethylacetal and 204 milliliters of diphenyl ether was charged to a 500 milliliter round bottom flask having three necks, and bearing a nitrogen inlet tube reaching below the surface of the mixture, a motor-driven stirrer, a thermometer reaching below the surface of the mixture, and a still-head adapter connected to a condenser and graduated receiver. An electric heating mantle was used to heat the flask. The mixture was stirred, and purified nitrogen bubbled therethrough at the rate of 33 cc. per minute while the temperature was raised from 30° C. to 125° C. over a period of 70 minutes. At this point 3.3 milliliters of dry hydrogen chloride was added via the incoming nitrogen stream. After 10 minutes another like amount of hydrogen chloride was added, followed by 1.6 cc. of hydrogen chloride after another 10 minute interval. At this point reaction set in, accompanied by the evolution of ethanol from the reaction mixture. At an interval of 18.5 minutes after the evolution of ethanol had begun, 64 milliliters of ethanol had been collected, and the rate of evolution had slackened. At this point, 1.1 cc. of hydrogen chloride was added to the reaction mixture, followed by four more like amounts added at 5 minute intervals. When the last of these additions had been made, the temperature of the reaction mixture was gradually raised from 125° C. to 254° C. over a period of 85 minutes, providing a clear, colorless, viscous polymer solution, and 80.5 milliliters of ethanol in the receiver. The solution was allowed to cool to 240° C., and poured quickly into a large Erlenmeyer flask and rinsed with a rapid stream of purified nitrogen. When the contents of the Erlenmeyer flask had cooled, it was cut into half-inch cubes and minced to a powder under cold acetone in a Waring Blendor. The polymer was collected on a filter, and the process repeated three more times using fresh acetone. The white filter cake was allowed to dry at room temperature. The polymer had a specific viscosity of 0.71 when a 0.25 gram was dissolved in 50 milliliters of a mixture of phenol and meta-cresol (65 parts phenol to 35 parts meta-cresol, by weight). X-ray diffraction indicates 71 percent lateral order. The polymer becomes slightly plastic at 250° C. The polycyclospiroacetal readily formed filaments when spun from a "dope" containing a mixture of phenol and meta-cresol (65 parts phenol to 35 parts meta-cresol, by weight). Filaments passed through an alcohol bath were readily cold drawable to many times their length.

*Example III*

To an equimolecular mixture of 3.96 grams of pentaerythritol, 8.63 grams of adipaldehyde tetrapropylacetal was added 20 grams of purified diphenyl ether. This mixture was agitated in an atmosphere of nitrogen for 110 minutes at 125° C. during which time 1.2 milliliters of gaseous hydrogen chloride was added in 8 increments. The temperature was then raised to 197° C. for 30 minutes, after which it was raised to 222° C. for 20 minutes. The resulting mixture was cooled in the nitrogen atmosphere, and triturated in a Waring Blendor with 250 milliliters of cold acetone, and filtered. The filter cake was twice more resuspended under acetone in the Blendor, and the resulting powdered polymer collected on a filter and dried in air. A 5.6 gram yield of white polymer was obtained which had a specific viscosity of 0.49 when a 0.25 gram sample was dissolved in 50 milliliters of a mixture of phenol and meta-cresol (65 parts phenol to 35 parts meta-cresol by weight). X-ray diffraction indicates 78 percent lateral order. The polymer becomes slightly plastic at 245° C. The polycyclospiroacetal readily formed filaments when spun from a "dope" containing a mixture of phenol and meta-cresol (65 parts phenol to 35 parts meta-cresol by weight). Filaments passed through an alcohol bath were readily cold drawable to many times their length.

*Example IV*

To an equimolecular mixture of 4.37 grams of pentaerythritol and 5.71 grams of succinaldehyde tetramethylacetal was added 19 milliliters of a mixture of diphenyl ether and nitrobenzene (1:1 by weight). This mixture was agitated in an atmosphere of nitrogen at 125° C. for 180 minutes during which time 3.0 milliliters of gaseous hydrogen chloride was added in 23 increments. The temperature was raised to 197° C. for 25 minutes, after which the mixture was allowed to cool to room temperature, still in an atmosphere of nitrogen. The resulting mixture was triturated with 350 milliliters of cold acetone in a Waring Blendor, and filtered. The polymer thus collected was twice again triturated with fresh acetone, and allowed to dry at 30° C. A 5.8 gram yield of light tan colored polymer was obtained which becomes slightly plastic at 235° C. in air. The polymer had a specific viscosity of 0.53 at 250° C. when 0.25 gram was dissolved in 50 milliliters of a mixture of phenol and meta-cresol (65 parts to 35 parts, by weight). X-ray diffraction indicates 73 percent lateral order. The polycyclospiroacetal readily formed filaments when spun from a "dope" containing a mixture of phenol and meta-cresol (65 parts to 35 parts, by weight). Filaments passed through an alcohol bath were readily cold drawable to many times their length.

In forming fibers from the polymer compositions of the instant invention, well-known solution spinning methods, such as wet-spinning and dry-spinning, may be employed. Conventional equipment ordinarily employed in the manufacture of synthetic and artificial fibers and filaments by the wet-spinning and dry-spinning processes may also be used. In the wet-spinning process a solution of the polymer, commonly referred to as the "dope" is extruded through an orifice or a plurality of orifices in the face of a spinneret which in turn is submerged in a coagulating medium or bath. The bath comprises a non-solvent for the polymer which is also a solvent for or miscible with the solvent in the "dope." The filament or filaments, as the case may be, are moved from the coagulating bath and passed through a washing medium where all residual solvents and coagulating liquid are removed therefrom. The washing medium is usually contained in a bath through which the filaments are passed and may flow concurrent with or countercurrent to the direction of travel of the filaments therethrough. Washing rolls or like apparatus may also be employed if desired. In the dry-spinning method, the polycyclospiroacetal solution is extruded through a spinneret into a heated atmosphere which evaporates the volatile solvent.

The synthetic linear polycyclospiroacetals of the instant invention have many advantages over those already known. The polymers of the instant invention show excellent properties both physical and chemical for the use in the formation of films, fibers, bristles, coatings and the like. For example, films, fibers, filaments, shaped articles and the like formed therefrom are clear and colorless. Filaments or fibers made therefrom are strong and cold-drawable to many times their length by well-known procedures. In addition, the polymeric polycyclospiroacetals of the instant invention have high molecular weights. They are prepared by a more convenient method. For example, the use of the dialdehyde tetraalkylacetal avoids oxidation and self-polymerization which occurs with free aldehydes. The polymeric compounds also show a high resistance to alkalis and are insoluble in the more common organic solvents such as, acetone, alcohol and benzene.

As many apparently widely different embodiments of this invention may be made without departing from the spirit and scope thereof, it is to be understood that the same is not limited to the specific embodiments thereof except as defined in the appended claims.

I claim:

1. Synthetic linear polycyclospiroacetals containing structural units of the formula,

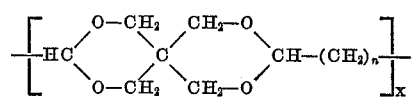

wherein $n$ is an integer from 1 to 6 and X is an integer of at least 20.

2. Fiber-forming synthetic linear polycyclospiroacetals as defined in claim 1 having a specific viscosity of 0.3 to 1.0.

3. A process for preparing synthetic linear polycyclospiroacetals containing structural units of the formula,

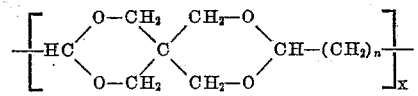

wherein n is an interger from 1 to 6 and X is an integer of at least 20 comprising mixing pentaerythritol and a dialdehyde tetraalkylacetal having the general formula,

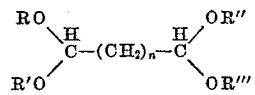

wherein R, R', R'' and R''' are alkyl groups containing 1 to 4 carbon atoms and n is an integer from 1 to 6; dissolving said pentaerythritol and said dialdehyde tetraalkylacetal in a common solvent therefor and heating the mixture in the presence of a catalyst to a temperature in the range of 60° C. to 280° C. for a period up to 4 hours; said process being carried out in an inert atmosphere.

4. The process as defined in claim 3 wherein the dialdehyde tetraalkylacetal is glutaraldehyde tetraethylacetal.

5. The process as defined in claim 3 wherein the dialdehyde tetraalkylacetal is adipaldehyde tetrapropylacetal.

6. The process as defined in claim 3 wherein the dialdehyde tetraalkylacetal is succinaldehyde tetramethylacetal.

7. The process as defined in claim 3 wherein the dialdehyde tetraalkylacetal is malonaldehyde tetrabutylacetal.

8. The process as defined in claim 3 wherein the dialdehyde tetraalkylacetal is adipaldehyde tetraethylacetal.

9. The process as defined in claim 3 wherein the common solvent is diphenyl ether.

10. The process as defined in claim 3 wherein the common solvent is para-phenylanisole.

11. The process as defined in claim 3 wherein the common solvent is nitrobenzene.

12. The process as defined in claim 3 wherein the catalyst is hydrogen chloride.

13. The process as defined in claim 3 carried out in an atmosphere of nitrogen.

14. A process for preparing synthetic linear polycyclospiroacetals containing structural units of the formula,

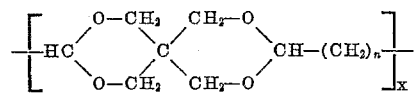

wherein n is an integer from 1 to 6 and X is an integer of at least 20 comprising mixing pentaerythritol and a dialdehyde tetraalkylacetal having the general formula,

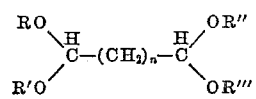

wherein R, R', R'' and R''' are alkyl groups containing 1 to 4 carbon atoms and n is an integer from 1 to 6; dissolving said pentaerythritol and said dialdehyde tetraalkylacetal in ortho-phenylanisole and heating the mixture to a temperature in the range of 60° C. to 280° C. for a period of up to 4 hours in the presence of hydrogen chloride; said hydrogen chloride being added in incremental amounts to the reaction mixture; said process being carried out in an inert atmosphere.

15. The synthetic linear polycyclospiroacetal containing structural units of the formula,

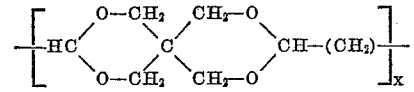

wherein X is an integer of at least 20.

16. The synthetic linear polycyclospiroacetal containing structural units of the formula,

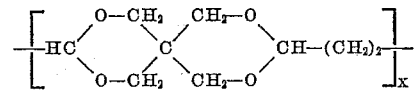

wherein X is an integer of at least 20.

17. The synthetic linear polycyclospiroacetal containing structural units of the formula,

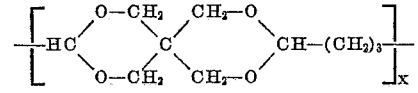

wherein X is an integer of at least 20.

18. The synthetic linear polycyclospiroacetal containing structural units of the formula,

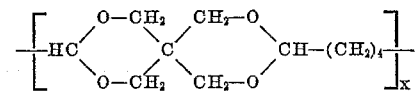

wherein X is an integer of at least 20.

19. The synthetic linear polycyclospiroacetal containing structural units of the formula,

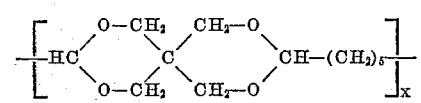

wherein X is an integer of at least 20.

References Cited in the file of this patent

UNITED STATES PATENTS

| | | |
|---|---|---|
| 2,662,099 | Thiele | Dec. 8, 1953 |
| 2,691,684 | Frevel et al. | Oct. 12, 1954 |

FOREIGN PATENTS

| | | |
|---|---|---|
| 718,502 | Great Britain | Nov. 17, 1954 |
| 842,075 | Germany | July 8, 1949 |

OTHER REFERENCES

Schultz et al.: Angewandte Chemie, vol. 62, No. 5, pp. 105–132, March 7, 1950. Copy in Library.